US012067921B2

(12) United States Patent
Zhang

(10) Patent No.: US 12,067,921 B2
(45) Date of Patent: Aug. 20, 2024

(54) DISPLAY DEVICE BRIGHTNESS COMPENSATION LOOK-UP TABLE MANUFACTURING METHOD, DEVICE THEREOF, AND DISPLAY DEVICE

(71) Applicant: TCL CHINA STAR OPTOELECTRONICS TECHNOLOGY CO., LTD., Guangdong (CN)

(72) Inventor: Yun Zhang, Guangdong (CN)

(73) Assignee: TCL China Star Optelectronics Technology Co., Ltd., Shenzhen (CN)

( * ) Notice: Subject to any disclaimer, the term of this patent is extended or adjusted under 35 U.S.C. 154(b) by 0 days.

(21) Appl. No.: 17/600,404

(22) PCT Filed: Aug. 25, 2021

(86) PCT No.: PCT/CN2021/114575
§ 371 (c)(1),
(2) Date: Sep. 30, 2021

(87) PCT Pub. No.: WO2023/010625
PCT Pub. Date: Feb. 9, 2023

(65) Prior Publication Data

US 2024/0046835 A1 Feb. 8, 2024

(30) Foreign Application Priority Data

Aug. 2, 2021 (CN) ......................... 202110879648.0

(51) Int. Cl.
*G09G 3/20* (2006.01)

(52) U.S. Cl.
CPC ... *G09G 3/2003* (2013.01); *G09G 2320/0233* (2013.01); *G09G 2320/0242* (2013.01); *G09G 2320/0285* (2013.01); *G09G 2360/16* (2013.01)

(58) Field of Classification Search
CPC ......... G09G 3/2003; G09G 2320/0233; G09G 2320/0242; G09G 2320/0285; G09G 2360/16; G09G 2320/0271; G09G 3/2022; G09G 3/2044; G09G 5/10; G09G 2320/0693; G09G 2360/145; G09G 3/006; G09G 3/20; G09G 5/06; G09G 2290/00
See application file for complete search history.

(56) References Cited

U.S. PATENT DOCUMENTS

| | | | |
|---|---|---|---|
| 2010/0013751 | A1 | 1/2010 | Kerofsky et al. |
| 2011/0227941 | A1 | 9/2011 | Huang |

(Continued)

FOREIGN PATENT DOCUMENTS

| | | |
|---|---|---|
| CN | 101325024 | 12/2008 |
| CN | 104064156 | 9/2014 |

(Continued)

*Primary Examiner* — Lunyi Lao
*Assistant Examiner* — Jarurat Suteerawongsa

(57) ABSTRACT

The present application discloses a display device brightness compensation look-up table obtaining method. The method includes a parameter reading step, an initial grayscale brightness detection step, a compensation region brightness detection step, a compensation data obtaining step, and a compensation look-up table generation step. The above method solves a technical issue that conventional demura technologies cannot uniform brightness of the display panel to result in poor quality of the display panel.

14 Claims, 8 Drawing Sheets

(56) References Cited

U.S. PATENT DOCUMENTS

| | | | | |
|---|---|---|---|---|
| 2014/0063080 | A1* | 3/2014 | Wu | G09G 5/10<br>345/76 |
| 2019/0348001 | A1* | 11/2019 | Shi | G09G 3/32 |
| 2021/0097927 | A1* | 4/2021 | Matsueda | G09G 3/3283 |

FOREIGN PATENT DOCUMENTS

| | | |
|---|---|---|
| CN | 106531045 | 3/2017 |
| CN | 106847157 | 6/2017 |
| CN | 107180605 | 9/2017 |
| CN | 107492335 | 12/2017 |
| CN | 108694912 | 10/2018 |
| CN | 109285498 | 1/2019 |
| CN | 110400548 | 11/2019 |
| CN | 111276086 | 6/2020 |

* cited by examiner

DISPLAY DEVICE BRIGHTNESS COMPENSATION LOOK-UP TABLE MANUFACTURING METHOD, DEVICE THEREOF, AND DISPLAY DEVICE

RELATED APPLICATIONS

This application is a National Phase of PCT Patent Application No. PCT/CN2021/114575 having International filing date of Aug. 25, 2021, which claims the benefit of priority of Chinese Patent Application No. 202110879648.0 filed on Aug. 2, 2021. The contents of the above applications are all incorporated by reference as if fully set forth herein in their entirety.

FIELD AND BACKGROUND OF THE INVENTION

The present application relates to a field of display panels, especially to a display device brightness compensation look-up table obtaining method, a device thereof, and a display device thereof.

No matter thin film transistor liquid crystal display panels (TFT-LCDs) or organic light emitting diode (OLED) display panels, during manufacturing processes, issues of brightness uniformity and color uniformity are inevitable. Particularly, with increase of a size of a display panel, the issue of uneven brightness and uneven colors becomes common. Therefore, demura technologies for eliminating an uneven brightness phenomenon has been developed accordingly.

One of demura technologies is white tracking (WT). The white tracking is a very important function of a timing controller (Tcon) of the TFT-LCD and can re-allocate grayscale voltage. For example, when the display panel outputs a grayscale range comprising 256 grayscale values, the WT function can change displayed brightness by changing a voltage corresponding to each grayscale value. The white tracking function comprises two more precise grayscale controlling methods which are frame control (Frame Rate Control, FRC) and dither, and more precisely controls the voltage corresponding to each grayscale value by these two controlling methods to achieve calibration of brightness and colors.

However, the above conventional display panel demura compensation technology comprises shortcomings as follows.

The demura compensation method is mainly applied to ease local mura of display panel, but is limited for easing entirely uneven brightness and uneven chroma. Especially a condition that brightness of an edger of the display panel is far lower than that of a central region of the display panel results in that although after demura a mura issue of the display panel is mitigated partially, entire uniformity of the brightness and chroma of the display panel cannot reach an expected level and the brightness of the edge region of the display panel is still darker than the brightness in the central region to cause uneven brightness and uneven colors of the display panel, which results in poor quality of the display panel.

SUMMARY OF THE INVENTION

Technical Issue

The present application provides a display device brightness compensation look-up table obtaining method, a device thereof, and a display device thereof to solve a technical issue that conventional demura technologies cannot make entire uniformity of brightness and chroma of a display panel to reach an expected level and brightness in an edge region of the display panel is still darker than brightness of a central region of the display panel to cause uneven brightness and colors of the display panel, which results in poor quality of the display panel.

Technical Solution

In an aspect, the present application provides a display device brightness compensation look-up table obtaining method, comprising:

- a parameter reading step comprising loading a plurality of parameters into a process unit of a display device brightness compensation look-up table generation device, wherein the parameters comprise: compensation region dividing parameters of a display panel of a display device and a plurality of calibration gray scale values, and the compensation region dividing parameters comprise a means for dividing the display panel into a plurality of compensation regions;
- an initial grayscale brightness detection step comprising according to one of the calibration gray scale values, for the display device displaying an image with the same calibration gray scale value throughout the image, detecting and recording a true brightness value of each of the compensation regions of the display device;
- a compensation region brightness detection step comprising defining one of the compensation regions of the display device as a standard compensation region, and for the compensation region having the true brightness value different from the true brightness value of the standard compensation region, detecting the true brightness value of the compensation region after a display grayscale value of the display device is adjusted;
- a compensation data obtaining step comprising repeatedly implementing the compensation region brightness detection step and defining the display grayscale value of the display device as compensation data when a difference between the true brightness value of the compensation region and the true brightness value of the standard compensation region is a minimum difference; and
- a compensation look-up table generation step comprising under the calibration gray scale values, recording each of the compensation regions and compensation data of each of the compensation regions to constitute a brightness compensation look-up table corresponding to the calibration gray scale values.

In some embodiments of the present application, the means for dividing the display panel into the compensation regions comprises dividing the display panel into a plurality of compensation regions being rectangular, wherein an area of the compensation region near a periphery of the display device is less than an area of the compensation region near a center of the display device, and the compensation region located at the center of the display device is a standard compensation region.

In some embodiments of the present application, in the compensation region brightness detection step, the display device brightness compensation look-up table generation device simultaneously obtains the true brightness values of all of the compensation regions.

In some embodiments of the present application, the display device comprises a white tracking (WT) function including a frame control (FRC) function or a dither function, a grayscale value adjustment unit of the display device is less than 1 grayscale level, in the compensation region brightness detection step, the display grayscale value adjustment unit of the display device is less than 1 grayscale level.

In some embodiments of the present application, in the compensation data obtaining step repeatedly implementing the compensation region brightness detection step and defining the display grayscale value of the display device as compensation data when a difference between the true brightness value of the compensation region and the true brightness value of the standard compensation region is a minimum difference, the display grayscale value of the display device is adjusted by using an adjustment unit of 1 grayscale level to obtain a value of the minimum difference, and then is adjusted by using an adjustment unit less than 1 grayscale level to obtain a more precise value of the minimum difference.

In some embodiments of the present application, the display device brightness compensation look-up table generation device is connected to the display device through a transmission line to provide the display device in the initial grayscale brightness detection step with image data displayed entirely with the same calibration gray scale value, and the display device brightness compensation look-up table obtaining method, after the compensation look-up table generation step, further comprises:

a brightness compensation look-up table output step comprising outputting and storing the brightness compensation look-up table into the display device through the transmission line.

In some embodiments of the present application, the brightness compensation look-up table records each of the compensation regions and a compensation coefficient of each of the compensation regions, and the compensation coefficient=compensation data/calibration gray scale value.

In some embodiments of the present application, a number of the calibration gray scale values is less than 256, and a number of the calibration gray scale values less than level 128 is greater than a number of the calibration gray scale values greater than level 128.

In another aspect, the present application provides a display device, wherein the display device comprises:

a display panel;

a control unit connected to the display panel, and configured to provide display panel with a driver voltage according to grayscale data;

a memory unit comprising a plurality of brightness compensation look-up tables corresponding to a plurality of calibration gray scale values, wherein each of the calibration gray scale values corresponds to one of the brightness compensation look-up tables, each of the brightness compensation look-up tables divides the display panel into a plurality of compensation regions, and each of the compensation regions provides a compensation coefficient; and a process unit connected to the control unit and the memory unit, wherein the process unit is configured to, when pixels in each of the compensation regions display first grayscale data, multiply the first grayscale data by the compensation coefficient corresponding to the compensation region in the brightness compensation look-up table corresponding to the first grayscale data to obtain a product and then send the product to the control unit.

In some embodiments of the present application, the means for dividing the display panel into a plurality of compensation regions comprises dividing the display panel into a plurality of compensation regions being rectangular, wherein an area of the compensation region near a periphery of the display device is less than an area of the compensation region near a center of the display device, and the compensation region located at the center of the display device is the standard compensation region; in the compensation region brightness detection step, the display device brightness compensation look-up table generation device simultaneously obtains the true brightness values of all of the compensation region; and the display device comprises a white tracking (WT) function including a frame control (FRC) function or a dither function, a grayscale value adjustment unit of the display device is less than 1 grayscale level, in the compensation region brightness detection step, the display grayscale value adjustment unit of the display device is less than 1 grayscale level.

In some embodiments of the present application, in the compensation data obtaining step repeatedly implementing the compensation region brightness detection step and defining the display grayscale value of the display device as compensation data when a difference between the true brightness value of the compensation region and the true brightness value of the standard compensation region is a minimum difference, the display grayscale value of the display device is adjusted by using an adjustment unit of 1 grayscale level to obtain a value of the minimum difference, and then is adjusted by using an adjustment unit less than 1 grayscale level to obtain a more precise value of the minimum difference.

In some embodiments of the present application, the display device brightness compensation look-up table generation device is connected to the display device through a transmission line to provide the display device in the initial grayscale brightness detection step with image data displayed entirely with the same calibration gray scale value, and the display device brightness compensation look-up table obtaining method, after the compensation look-up table generation step, further comprises:

a brightness compensation look-up table output step comprising outputting and storing the brightness compensation look-up table into the display device through the transmission line.

In some embodiments of the present application, the brightness compensation look-up table records each of the compensation regions and a compensation coefficient of each of the compensation regions, and the compensation coefficient=compensation data/calibration gray scale value.

In some embodiments of the present application, a number of the calibration gray scale values is less than 256, and a number of the calibration gray scale values less than level 128 is greater than a number of the calibration gray scale values greater than level 128.

In another aspect, the present application provides a display device brightness compensation look-up table generation device, wherein the display device brightness compensation look-up table generation device comprises:

a brightness detection unit configured to detect an image brightness of a display panel of a display device;

a connection line unit configured to connect with the display device and provide a display device with a plurality of image data such that the display device generates an image with a single grayscale on the entire image according to the image data, and store the look-up table into a control unit of the display device after a look-up table is generated; and a process unit connected to the brightness detection unit, and configured to receive detection data provided by the brightness detection unit, wherein the process unit comprises:

a parameter reading module configured to load a plurality of parameters, wherein the parameters is recorded in a storage module or inputted by a user interface module, and the parameters comprise: a plurality of compensation region dividing parameters of the display panel of the display device and a plurality of calibration gray scale values, wherein the compensation region dividing parameters comprise a means for dividing the display panel into a plurality of compensation regions;

a grayscale brightness detection module configured to control the brightness detection unit to detect true brightness values displayed by the compensation regions;

a compensation region brightness calculation module configured to define one of the compensation regions as a standard compensation region, and configured to, for the compensation region having the true brightness value different from the true brightness value of the standard compensation region, detect the true brightness value of the compensation region after a display grayscale value of the display device is adjusted;

a compensation data obtaining module configured to control the compensation region brightness calculation module to repeatedly implement compensation region brightness detection and define the display grayscale value of the display device as compensation data when a difference between the true brightness value of the compensation region and the true brightness value of the standard compensation region is a minimum difference; and a compensation look-up table generation module configured to, under the calibration gray scale values, record each of the compensation regions and the compensation data of each of the compensation regions to constitute a brightness compensation look-up table corresponding to the calibration gray scale values; and a brightness compensation look-up table output module configured to output and store the brightness compensation look-up table to the display device through the connection line unit.

Advantages

The present application comprises at least advantages as follows:

The present application provides a display device brightness compensation look-up table obtaining method, a device thereof, and a display device thereof. The display device brightness compensation look-up table obtaining method comprises a compensation look-up table generation step. The display device comprises a memory unit including a brightness compensation look-up table. The display device brightness compensation look-up table generation device comprises a brightness compensation look-up table output module configured to output a brightness compensation look-up table. The present application, records compensation data of each of the compensation regions and the compensation region to constitute a brightness compensation look-up table corresponding to the calibration gray scale values according to the calibration gray scale values, performs brightness compensation to the compensation regions of the display device according to the brightness compensation look-up table, and therefore solve the technical issue that conventional demura technologies cannot make entire uniformity of brightness and chroma of the display device reach an expected level such that brightness of an edge region of display device is still darker than brightness of a central region to cause uneven brightness and color of the display device to result poor quality of the display panel. Furthermore, original grayscale voltage and white tracking function of the display device are used in the method and the device of in the present application, only a few register addresses are needed to be added in a timing controller of the display device for storing brightness compensation look-up tables of several selected calibration gray scale values, brightness compensation look-up tables of other grayscale values can be obtained by an interpolation process, and therefore there is almost no need for changing hardware of the display device and a cost of modifying the display device is ultra low.

BRIEF DESCRIPTION OF THE SEVERAL VIEWS OF THE DRAWINGS

To more clearly elaborate on the technical solutions of embodiments of the present invention or prior art, appended figures necessary for describing the embodiments of the present invention or prior art will be briefly introduced as follows. Apparently, the following appended figures are merely some embodiments of the present invention. A person of ordinary skill in the art may acquire other figures according to the appended figures without any creative effort.

DESCRIPTION OF SPECIFIC EMBODIMENTS OF THE INVENTION

The technical solution in the embodiment of the present application will be clearly and completely described below with reference to the accompanying drawings in the embodiments of the present application. Apparently, the described embodiments are merely some embodiments of the present application instead of all embodiments. According to the embodiments in the present application, all other embodiments obtained by those skilled in the art without making any creative effort shall fall within the protection scope of the present application.

The embodiment of the present application provides a display device brightness compensation look-up table obtaining method, a display device 1, and a display device brightness compensation look-up table generation device 2, which are described in details as follows. It should be explained that a description order of the embodiments has no limit to a preferring order of the embodiment.

Figure 1A:
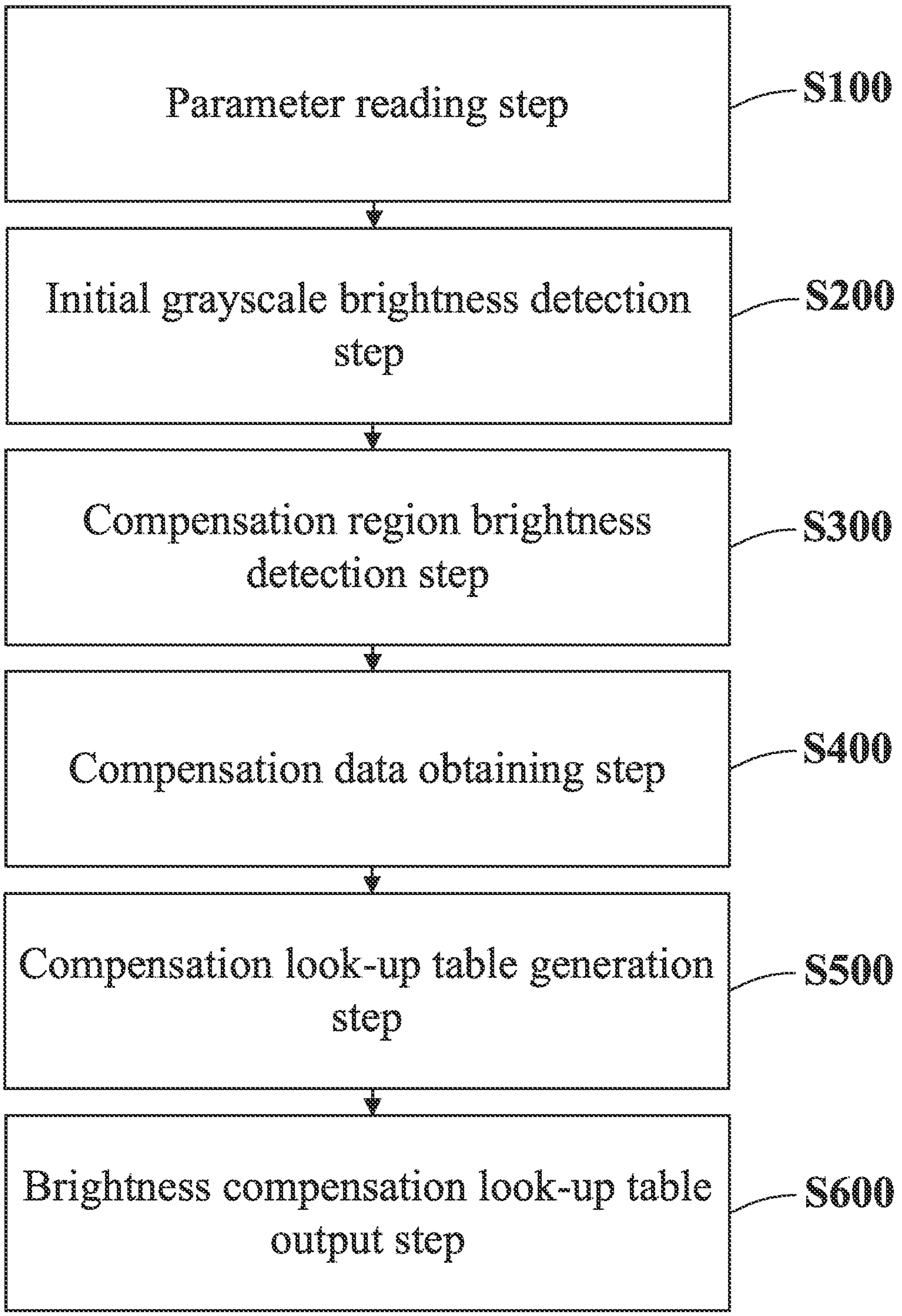
FIG. 1*a* is a flowchart of a display device brightness compensation look-up table obtaining method provided by an embodiment of the present application.

With reference to FIG. 1*a*, the display device brightness compensation look-up table obtaining method comprises: a parameter reading step S100, an initial grayscale brightness detection step S200, a compensation region brightness detection step S300, a compensation data obtaining step S400, and a compensation look-up table generation step S500.

Figure 4:
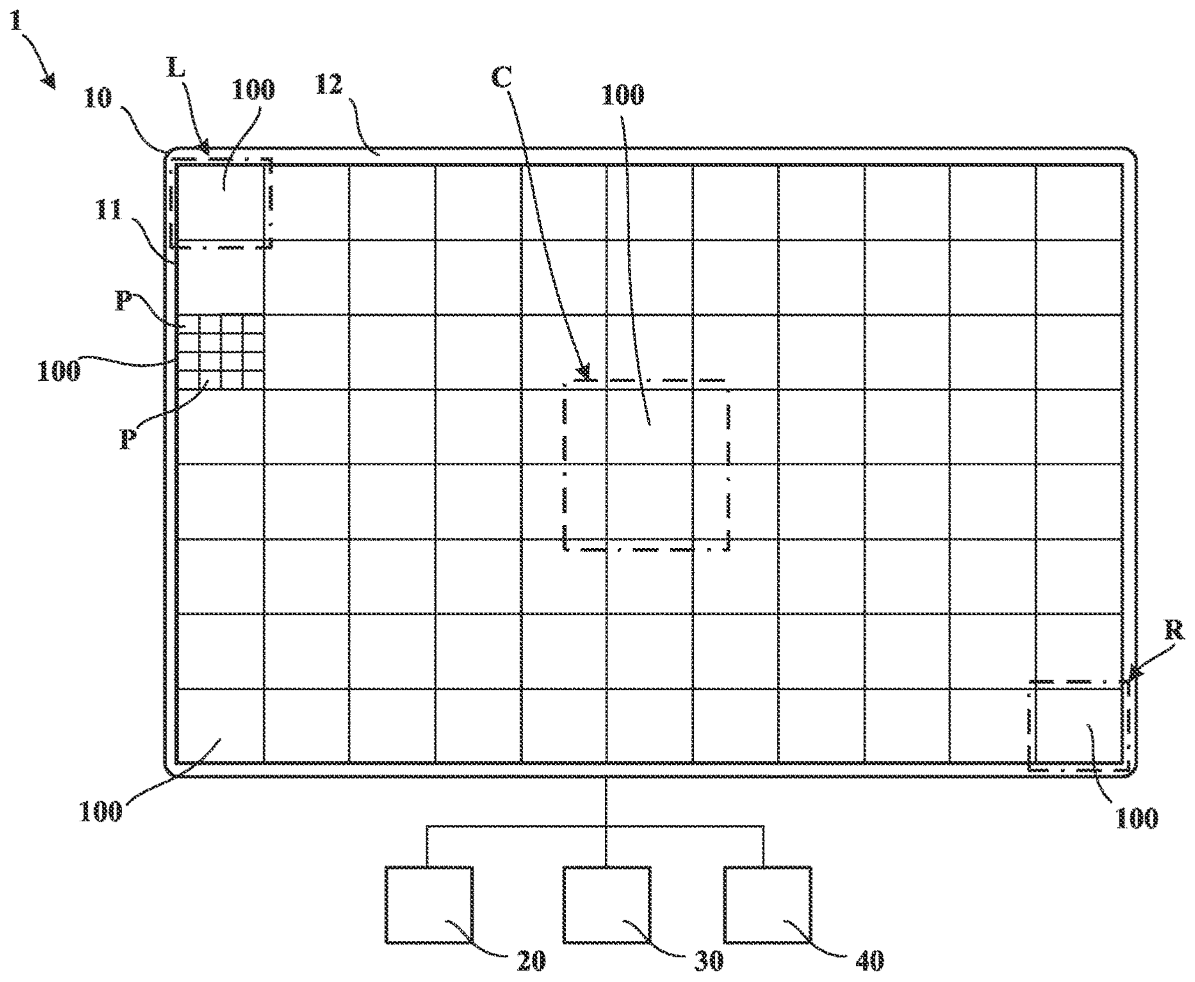
FIG. 4 is a schematic plan view of a display device of an embodiment of the display device brightness compensation look-up table obtaining method provided by the embodiment of the present application.

With reference to FIG. 4, the parameter reading step S100 comprises loading a plurality of parameters into a process unit of a display device brightness compensation look-up table generation device, wherein the parameters comprise: compensation region dividing parameters of a display panel 10 of a display device 1 and a plurality of calibration gray scale values, and the compensation region dividing parameters comprise a means for dividing the display panel 10 into a plurality of compensation regions 100. In the preferred embodiment of the present application, the display panel 10 further comprises a display region 11 and a non-display region 12 surrounding the display region 11, and the compensation regions are located in the display region 11.

Figure 5:
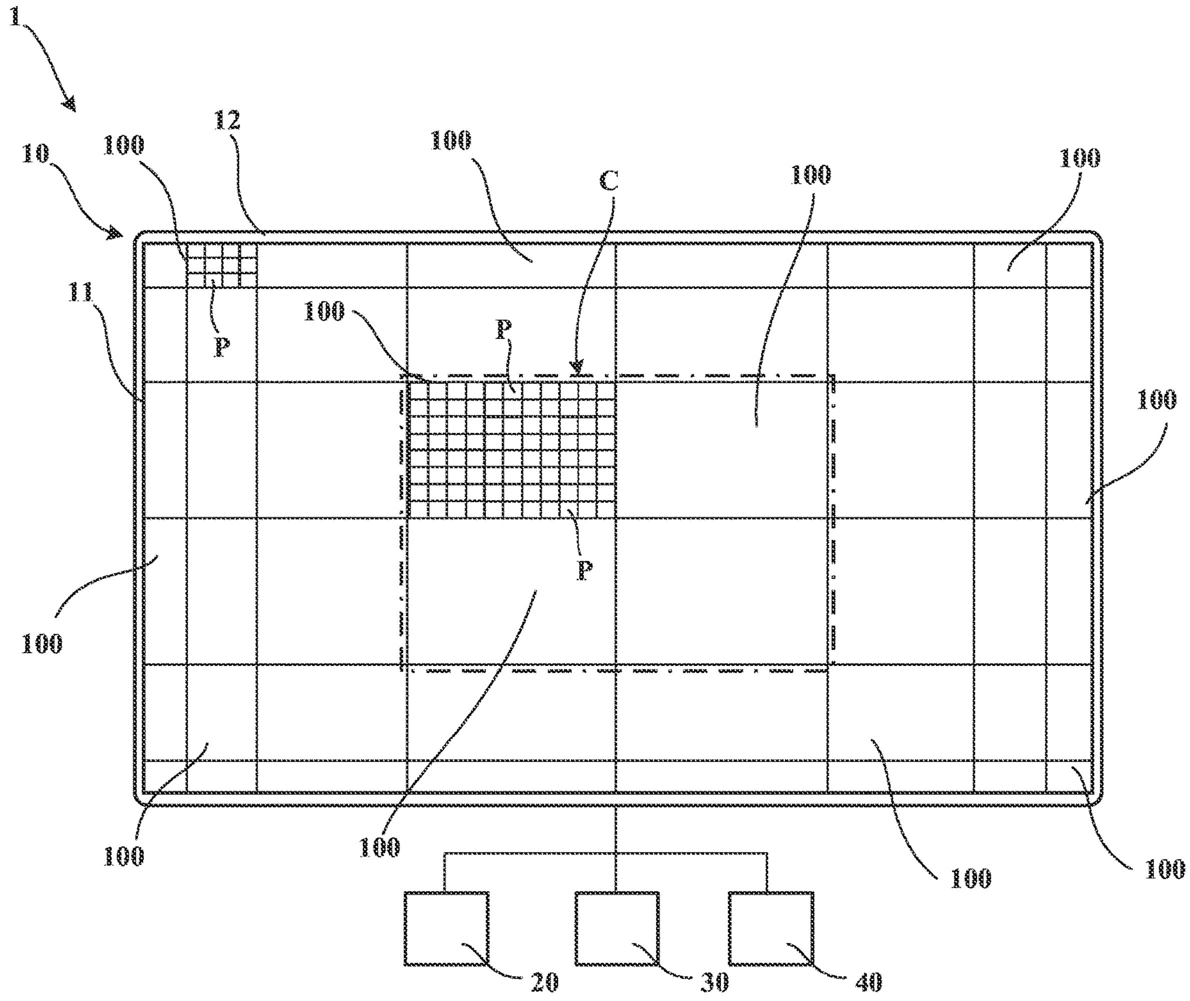
FIG. 5 is a schematic plan view of the display device of another embodiment of the display device brightness compensation look-up table obtaining method provided by the embodiment of the present application.

With reference to FIGS. 4 and 5, in the preferred embodiment of the present application, the means for dividing the display panel 10 into the compensation regions 100 comprises dividing the display panel into a plurality of compensation regions 100 being rectangular, wherein an area of the compensation region 100 near a periphery of the display device 1 is less than an area of the compensation region near a center of the display device 1, and the compensation region located at the center of the display device 1 is a standard compensation region 100, as shown in FIG. 5.

The initial grayscale brightness detection step S200 comprises according to one of the calibration gray scale values, for the display device displaying an image with the same calibration gray scale value throughout the image, detecting and recording a true brightness value of each of the compensation regions 100 of the display device 1. The initial grayscale brightness detection step S200 usually uses the display device brightness compensation look-up table generation device, for example, an optical meter or a camera disposed on an automatic measuring machine is used for automatically detect a true brightness value of each of the compensation regions 100. For example, a Minolta CA310 color analyzer is used for detecting a true brightness value. The optical meter or the camera can automatically detect brightness of the display panel in a two-dimensional range, or detect brightness of a single point.

The compensation region brightness detection step S300 comprises defining one of the compensation regions 100 of the display device 1 as a standard compensation region, and for the compensation region 100 having the true brightness value different from the true brightness value of the standard compensation region, detecting the true brightness value of the compensation region 100 after a display grayscale value of the display device 1 is adjusted.

Specifically, to compensate the issue of uneven brightness and uneven colors of the entire display device 1, in the initial grayscale brightness detection step S200, display data setting an entire image frame with the same grayscale value is provided to make the entire screen of the display device 1 to show the same grayscale value such that in the compensation region brightness detection step S300, the optical meter can compare and find out a region with different brightness.

Specifically, in the compensation region brightness detection step S300, when it is found out that the true brightness value of the compensation regions 100 is different from the true brightness value of the standard compensation region, no complicated calculation or adjustment is needed, only a display device default grayscale voltage setting value is required and used to adjust an image displayed on the entire screen of the display device 1. A means for adjustment is progressively increasing or decreasing a grayscale value of grayscale data of a displayed image of a frame by one grayscale unit and then making the display device 1 display. The display device 1 still displays the same grayscale value on the entire screen. The grayscale unit can be one grayscale level or be less than one grayscale level depending on an original display capability of the display device 1.

In the preferred embodiment of the present application, in the compensation region brightness detection step S300, the display device brightness compensation look-up table generation device simultaneously obtains the true brightness values of all of the compensation regions 100. Namely, the display device brightness compensation look-up table generation device can perform two dimensional brightness detection to the display panel 10 to obtain the true brightness values of all of the compensation regions 100. In this embodiment, after every adjustment of a displayed image of the display device 1, a comparison of the true brightness value to the true brightness value of the standard compensation region for one or all of the compensation regions 100 can be performed to simplify and accelerate the compensation region brightness detection step S300.

In the preferred embodiment of the present application, the display device 1 comprises a white tracking (WT) function including a frame control (FRC) function or a dither function, grayscale value adjustment unit of the display device is less than 1 grayscale level. In the compensation region brightness detection step, a display grayscale value adjustment unit of the display device is less than 1 grayscale level. Specifically, With reference to FIGS. 2 and 3, the white tracking function is a very important function of a timing controller (Tcon) of the thin film transistor liquid crystal display panel (TFT-LCD) and comprises two interpolation calculations that are frame control and dither, and can achieve more precise control to the grayscale value of a unit pixel P in the display panel 10 of the display device 1 to achieve an objective of brightness and color calibration.

Figure 2:
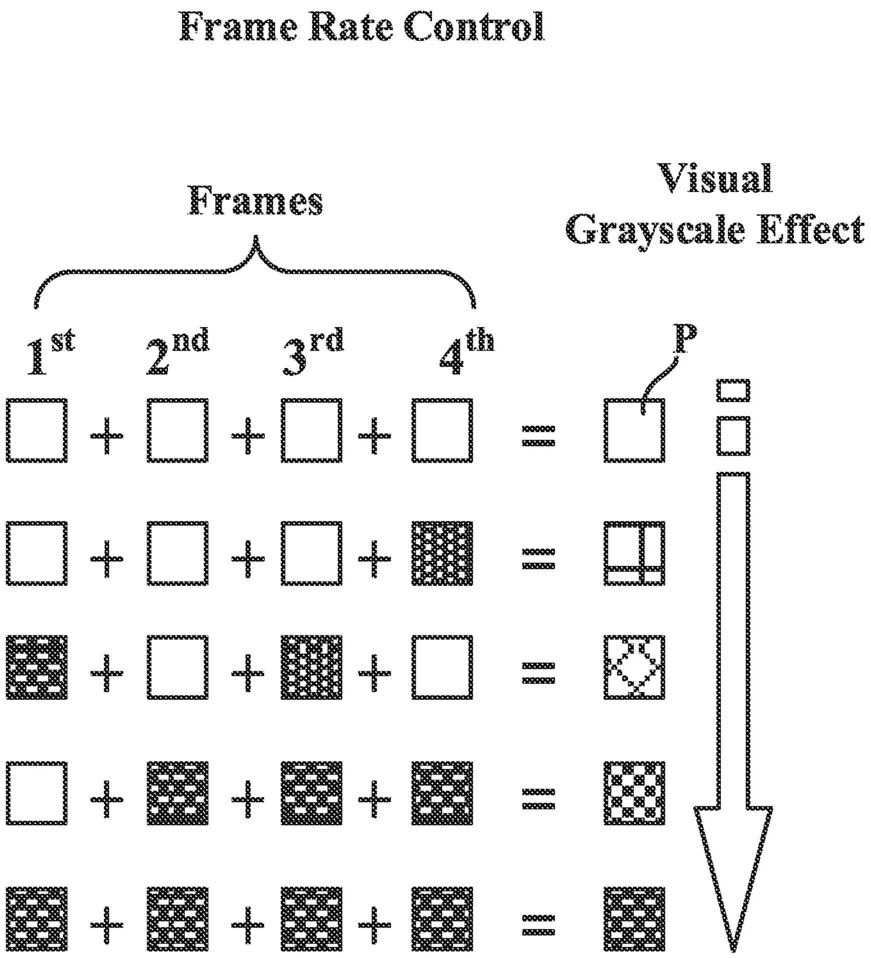
FIG. 2 is a schematic frame control principle view of a white tracking function of the display device brightness compensation look-up table obtaining method provided by the embodiment of the present application.

With reference to FIG. 2, the frame control function employs a human eye's visual persistence (or persistence of vision effect), namely, employs a characteristic that the human eye's brightness precision would not disappear instantly right after disappearance of brightness of an object to achieve brightness fusion in a certain period, which is time compensation, thereby achieving fine adjustment of visual grayscale effect. For example, by the frame control function, in four continuous image frames, namely, a first frame to a fourth frame, controlling a specific unit pixel P to be bright in all of the four frames presents maximum brightness. Controlling the specific unit pixel P to be dark in all of the four frames presents minimum brightness. Controlling the specific unit pixel P to be bright in some of the four frames and be dark in remains of the frames presents can present intervening brightness between the maximum brightness and the minimum brightness in a visual grayscale effect. As such, brightness of 1 grayscale level can be further divided into different four of brightness, namely, a minimum unit of 1 grayscale level for adjusting the grayscale is divided into 0.25 grayscale levels.

Figure 3:
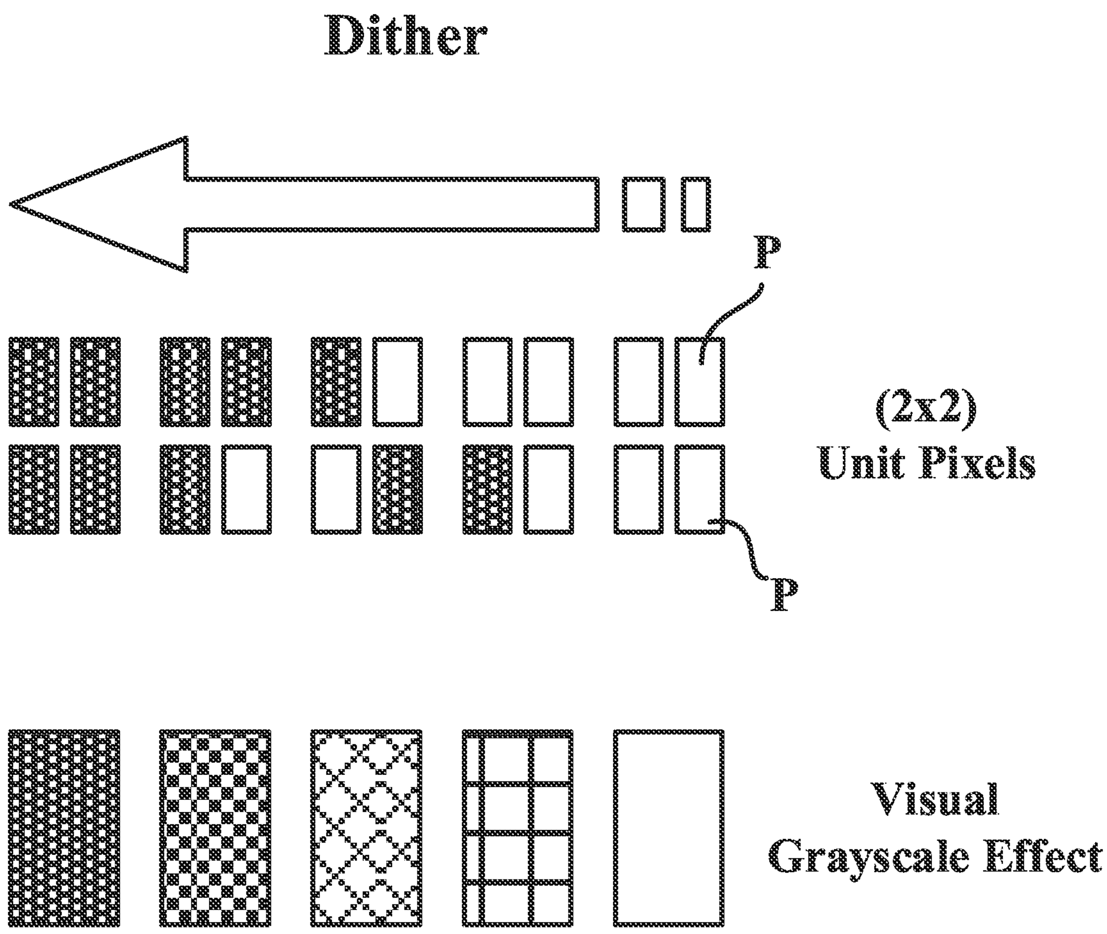
FIG. 3 is a schematic principle view of dither of the white tracking function of the display device brightness compensation look-up table obtaining method provided by the embodiment of the present application.

With reference to FIG. 3, the dither refers to expanding a grayscale range of an image frame by adjusting a space relation among unit pixels P. For example, several adjacent unit pixels P are viewed according to a normal viewing distance of the display panel 10, a human eye perceives an average of the grayscale values of the unit pixels P, which is spatial compensation. According to the way of the human eye perception, performing the dither to the display panel 10 can make the adjacent unit pixels P to commonly present a brightness value among two brightness values of the unit pixels P. Taking four adjacent unit pixels P as an example, controlling all of the unit pixels P to be fully bright presents maximum brightness, controlling all of the unit pixels P to be fully dark presents minimum brightness, and controlling some of the unit pixels P to be fully bright and remains of the unit pixels P to be fully dark can present intervening brightness between the maximum brightness and the minimum brightness in a visual grayscale effect. As such, a brightness value of one grayscale can be divided into four different brightness values, namely, a minimum unit of 1 grayscale level for adjusting the grayscale is divided into 0.25 grayscale levels.

The compensation data obtaining step S400, repeatedly implementing the compensation region brightness detection step S300 and defining the display grayscale value of the display device 1 as compensation data when a difference between the true brightness value of the compensation region and the true brightness value of the standard compensation region is a minimum difference.

Figure 1B:
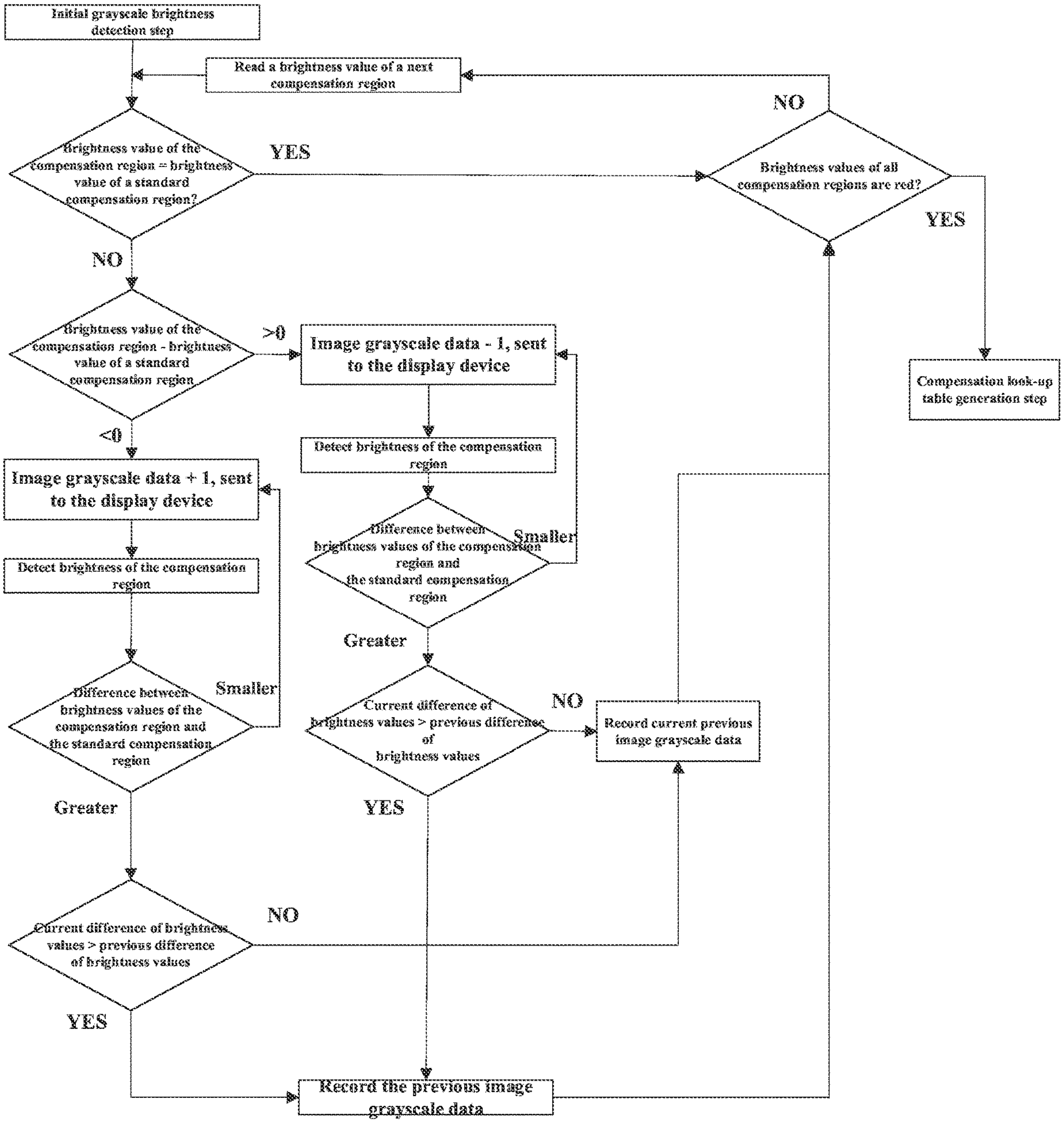
FIG. 1*b* is a flowchart of a computer program example of a compensation region brightness detection step and a compensation data obtaining step provided by the embodiment of the present application.

With reference to FIG. 1*b*, FIG. 1*b* is an example for achieving the compensation region brightness detection step S300 and the compensation data obtaining step S400 by a computer program. Compensation data of all of the compensation regions of the display device 1 can be obtained according to a selected calibration gray scale value.

Specifically, to make a cost of modification of the display device ultra low, original grayscale voltage and white tracking function of the display device are used. Therefore, the present application does not adjust a pixel driver voltage corresponding to the grayscale value of the display device but finds the grayscale value of each of the compensation regions a brightness value of which most approximates to the true brightness value of the standard compensation region. Therefore, the compensation data obtaining step S400 comprises repeatedly implementing the compensation region brightness detection step S300 to find the display grayscale value of the display device 1 corresponding to a minimum difference the true brightness value of the compensation regions and the true brightness value of the standard compensation region, and uses display grayscale value as compensation data.

In the preferred embodiment of the present application, in the compensation data obtaining step S400 repeatedly implementing the compensation region brightness detection step and defining the display grayscale value of the display device 1 as compensation data when a difference between the true brightness value of the compensation region and the true brightness value of the standard compensation region is a minimum difference, the display grayscale value of the display device 1 is adjusted by using an adjustment unit of 1 grayscale level to obtain a value of the minimum difference, and then is adjusted by using an adjustment unit less than 1 grayscale level to obtain a more precise value of the minimum difference. Specifically, the display grayscale value of the display device 1 is adjusted by a unit being 1 grayscale level as. When the minimum difference is obtained, the display grayscale value of the display device 1 is further adjusted by an adjustment unit being 0.25 grayscale level according to the frame control function or the dither function of the white tracking function to obtain a more precise minimum difference.

With reference to FIG. 4, the compensation look-up table generation step S500 comprises under the calibration gray scale values, recording each of the compensation regions and compensation data of each of the compensation regions to constitute a brightness compensation look-up table corresponding to the calibration gray scale values.

In the preferred embodiment of the present application, the display device brightness compensation look-up table generation device is connected to the display device through a transmission line to provide the display device 1 in the initial grayscale brightness detection step S200 with image data displayed entirely with the same calibration gray scale value, and the display device brightness compensation look-up table obtaining method, after the compensation look-up table generation step S500, further comprises:

a brightness compensation look-up table output step S600 comprising outputting and storing the brightness compensation look-up table into the display device 1 through the transmission line. Specifically, the brightness compensation look-up table is stored a register of a timing controller of the display device 1.

In the preferred embodiment of the present application, the brightness compensation look-up table records each of the compensation regions and a compensation coefficient of each of the compensation regions, and the compensation coefficient=compensation data/calibration gray scale value.

In the preferred embodiment of the present application, a number of the calibration gray scale values is less than 256, and a number of the calibration gray scale values less than level 128 is greater than a number of the calibration gray scale values greater than level 128.

Specifically, in the present application another embodiment, for a full grayscale range of the display device, for example 256 levels, the brightness compensation look-up table can be provided for each level, namely, a number of the calibration gray scale values is equal to that of all of the grayscale levels that the display device is able to display. As such, calculation loading of the display device can be lowered to enhance a display speed of the display device. However, a greater amount of data requires a greater memory device for storage. In the preferred embodiment of the present application, to reduce an amount of the stored data, only some of the calibration gray scale values are selected, and the number of the calibration gray scale values is less than 256. As such, only a few register addresses are added in the timing controller of the display device to store brightness compensation look-up tables for these selected calibration gray scale values, and the display device can obtain brightness compensation look-up tables of other grayscale values by an interpolation process, and therefore there is almost no need for changing hardware of the display device and a cost of modifying the display device is ultra low.

Specifically, a rule for selecting the calibration gray scale values can choose more calibration gray scale values in a low grayscale range because when displaying the low gray-scale, the display device usually has a greater brightness difference. For example, when the display device displays of a range of 256 levels, a number of the selected calibration gray scale values lower than a level 128 us greater than a number of the selected calibration gray scale values higher than the level 128.

With reference to FIG. 4 or 5, in another aspect, the present application the display device 1 comprises: a display panel 10, a control unit 20, a memory unit 30, and a process unit 40.

The control unit 20 is connected to the display panel 10, and is configured to provide the display panel 10 with a driver voltage according to grayscale data. The control unit 20 comprises a white tracking (WT) function including a frame control (FRC) function or a dither function and configured to display grayscale less than 1 grayscale level.

The memory unit 30 comprises a plurality of brightness compensation look-up tables corresponding to a plurality of calibration gray scale values, wherein each of the calibration gray scale values corresponds to one of the brightness compensation look-up tables, each of the brightness compensation look-up tables divides the display panel into a plurality of compensation regions 100, and each of the compensation regions 100 provides a compensation coefficient.

The process unit 40 is connected to the control unit 20 and the memory unit 30, the process unit 40 is configured to, when pixels in each of the compensation regions 100 display first grayscale data, multiply the first grayscale data by the compensation coefficient corresponding to the compensation region 100 in the brightness compensation look-up table corresponding to the first grayscale data to obtain a product and then send the product to the control unit 20.

Furthermore, when the first grayscale data is not the calibration gray scale value, then the process unit 40 is configured to use the compensation look-up tables corresponding to different two of calibration gray scale values and obtain a compensation look-up table corresponding to the first grayscale data by an interpolation process.

Figure 7:
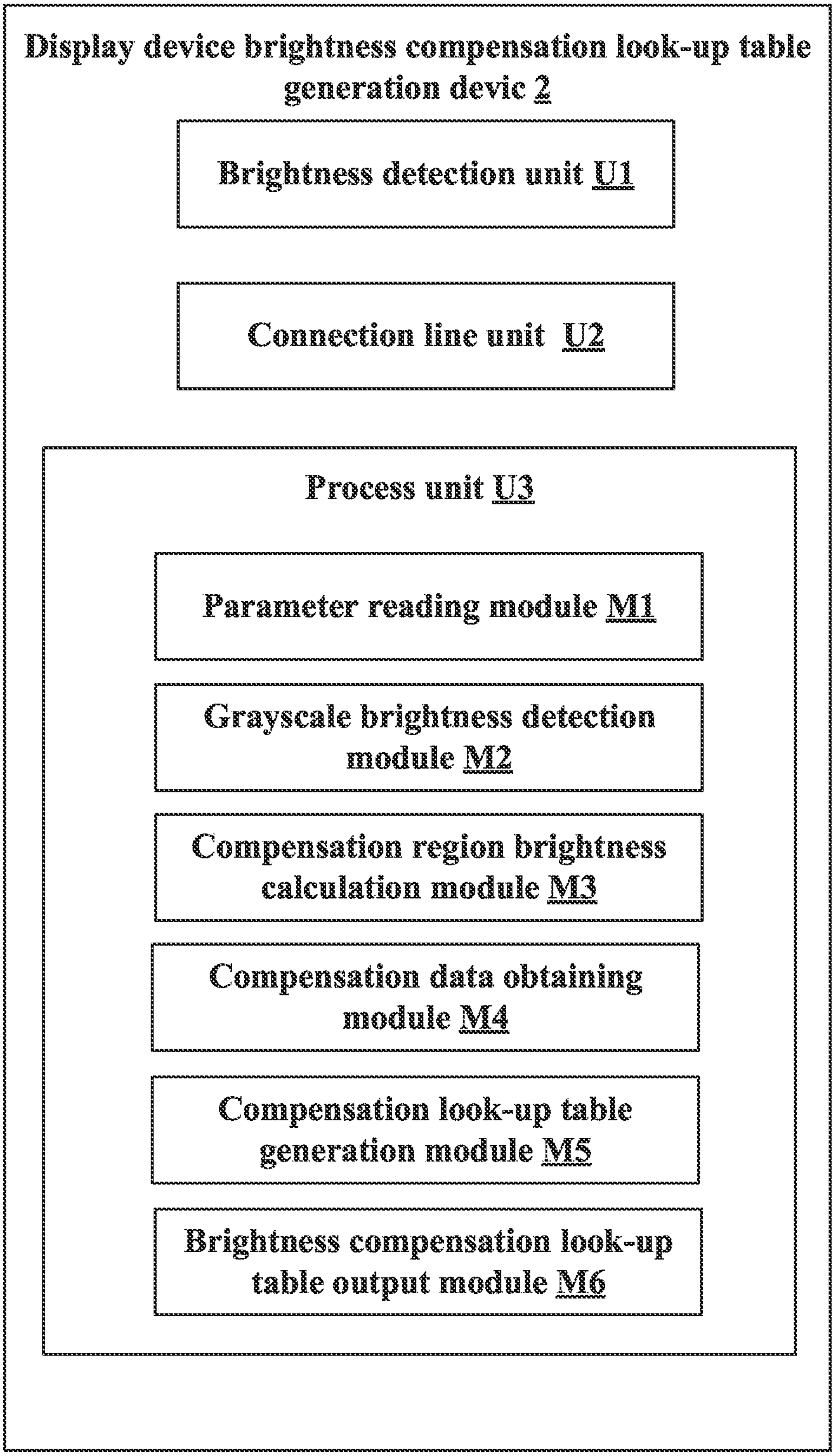
FIG. 7 is a framework diagram of a display device brightness compensation look-up table generation device provided by the embodiment of the present application.

With reference to FIG. 7, in another aspect, the display device brightness compensation look-up table generation device 2 of the present application comprises: a brightness detection unit U1, a connection line unit U2, and a process unit U3.

The brightness detection unit U1 is configured to detect an image brightness of a display panel 10 of a display device 1.

the connection line unit U2 is configured to connect with the display device 1 and provide a display device with a plurality of image data such that the display device generates an image with a single grayscale on the entire image according to the image data. The connection line unit U2 is also configured to store the look-up table into the memory unit 30 of the display device 1 after a look-up table is generated 1.

The process unit U3 is connected to the brightness detection unit U1, and is configured to receive detection data provided by the brightness detection unit U1. The process unit U3 comprises: a parameter reading module M1, a grayscale brightness detection module M2, a compensation region brightness calculation module M3, a compensation data obtaining module M4, a compensation look-up table generation module M5, and a brightness compensation look-up table output module M6.

The parameter reading module M1 is configured to load a plurality of parameters, wherein the parameters can be recorded in a storage module (not shown in the figures) or be inputted by a user interface module (not shown in the figures), the parameters comprise: a plurality of a plurality of compensation region dividing parameters of the display panel 10 of the display device 1 and a plurality of calibration gray scale values, the compensation region dividing parameters comprise a means for dividing the display panel 10 into a plurality of compensation regions 100.

The grayscale brightness detection module M2 is configured to control the brightness detection unit U1 to detect a true brightness value displayed by the compensation regions 100.

The compensation region 100 brightness calculation module M3 is configured to define one of the compensation regions as a standard compensation region, and configured to, for the compensation region 100 having the true brightness value different from the true brightness value of the standard compensation region 100, detect the true brightness value of the compensation region 100 after a display grayscale value of the image data provided to the display panel 10 is adjusted.

The compensation data obtaining module M4 is configured to control the compensation region brightness calculation module M3 to repeatedly implement compensation region brightness detection and define the display grayscale value of the display device as compensation data when a difference between the true brightness value of the compensation region 100 and the true brightness value of the standard compensation region is a minimum difference.

The compensation look-up table generation module M5 is configured to under the calibration gray scale values, record each of the compensation regions 100 and the compensation data of each of the compensation regions 100 to constitute a brightness compensation look-up table corresponding to the calibration gray scale values.

The brightness compensation look-up table output module M6 is configured to output and store the brightness compensation look-up table to the display device 1 through the connection line unit U2.

Specific examples will be used to explain applications of the present application the display device brightness compensation look-up table obtaining method as follows.

Example 1

With reference to FIG. 4, taking the grayscale range of the display panel 10 of the display device 1 being 256 levels (including 256 grayscale values from grayscale value 0 to grayscale value 255) as an example, a calculation of compensation coefficient is performed to the compensation region 100 of a left upper corner L and the compensation region 100 of a lower right corner R of the display panel 10. Taking the calibration gray scale values being 64 as an example, namely, the brightness that the display panel 10 is detected to have a display grayscale value 64 on an entire screen. When a display grayscale value of each of the compensation regions 100 in display region 11 of the display panel 10 is 64, an optical meter such as Minolta CA310 color analyzer is used to detect a true brightness value of the compensation region 100 of a center C of the display panel 10 being 10.3, a true brightness value of the compensation region 100 of the left upper corner L being 12.8, and a true brightness value of the compensation region 100 of the lower right corner R being 16.7. The above value indicates that the display panel 10 has a greater issue of uneven brightness.

Taking a center C of the display panel 10 compensation regions 100 as a standard compensation region, when the display panel 10 is adjusted to have a display grayscale value of 58 on the entire screen, namely, when each of the compensation regions 100 is adjusted to have a display grayscale value of 58, the true brightness value of the compensation region 10 of the left upper corner L0 is detected as 10.5. The display panel 10 is further adjusted to have a display grayscale value of 57 on the entire screen, and a true brightness value of the compensation region 10 of the left upper corner L0 is detected as 9.7. In other words, under the grayscale value of 58, the true brightness value of 10.5 of the compensation region 10 of the left upper corner L0 most approximates to the true brightness value of 10.3 of the standard compensation region—the compensation region 100 of the center C. Therefore, compensation data of the compensation region 10 of the left upper corner L0 is the grayscale value of 58 at present, and a compensation coefficient of the compensation region 100 of the left upper corner L corresponding to a calibration gray scale value of 64=compensation data/calibration gray scale values, namely, compensation coefficient=58/64=0.9.

When the display panel 10 is adjusted to have a display grayscale value of 56 on the entire screen, namely, when each of the compensation regions 100 is adjusted to have a display grayscale value of 56, a true brightness value of the compensation region 100 of the lower right corner R is 10.4. In other words, when the grayscale value is 56, a true brightness value of 10.4 of the compensation region 100 of the lower right corner R most approximates to the true brightness value of 10.3 of the standard compensation region—the compensation region 100 of the center C. Therefore, compensation data of the compensation region 100 of the lower right corner R is the grayscale value of 56 at present, and a compensation coefficient of the compensation region 100 of the lower right corner R corresponding to the calibration gray scale value of 64=compensation data/calibration gray scale values, namely, the compensation coefficient=56/64=0.87

Furthermore, when the display device 1 has a white tracking function, implementing the white tracking function can reduce a grayscale value adjustment unit of the display panel 10 to be less than 1 grayscale level, for example 0.25 levels, such that the entire grayscale range of the display panel 10 reaches 256*4=1024 grayscale levels, and adjustment of brightness is more precise during the above increase and decrease adjustment of the grayscale values.

Example 2

Figure 6:
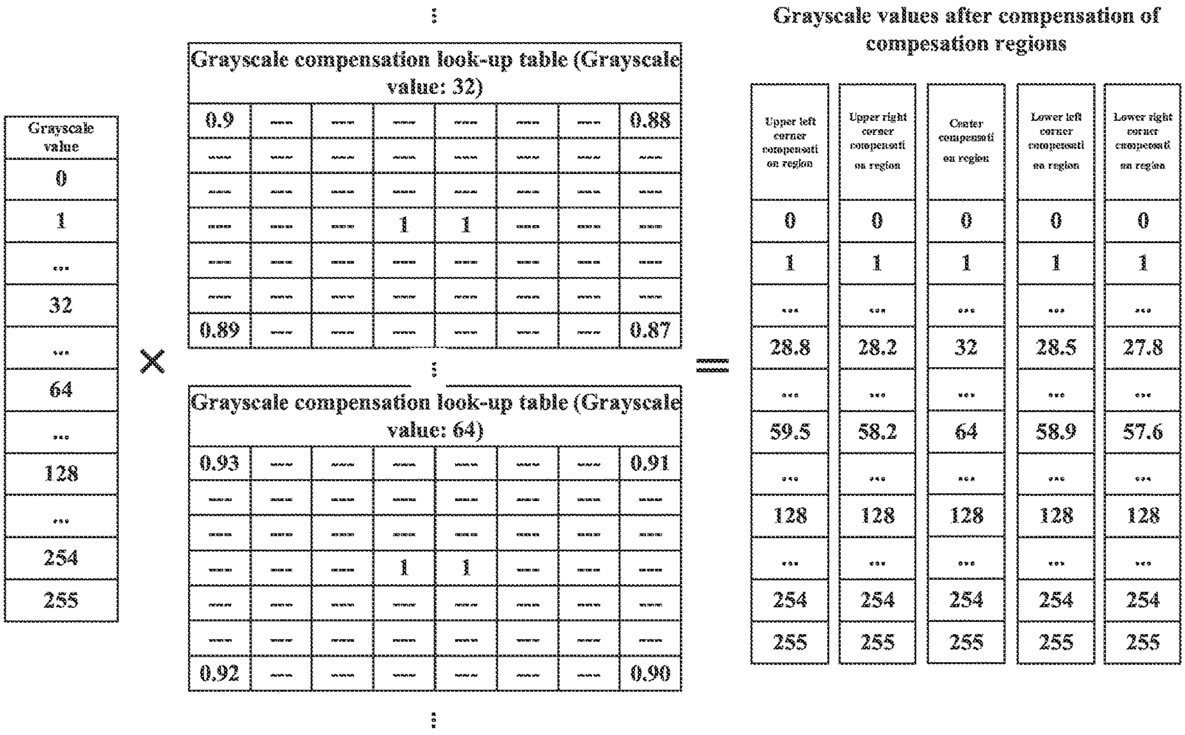
FIG. 6 is a schematic exemplary view of the display device brightness compensation look-up table obtaining method provided by the embodiment of the present application.

With reference to FIGS. 4 and 6, taking a grayscale range of the display panel 10 of the display device 1 being 256 levels (including 256 grayscale values from grayscale value 0 to grayscale value 255) as an example, when the display panel 10 is to display a grayscale value of 32, according to a corresponding brightness compensation look-up table, a compensation coefficient of the compensation region 100 of the center C of the display panel 10 is 1, and then the compensation data is 32*1=32 (because the compensation region 100 of the center C of the display panel 10 serves as standard compensation region, the compensation coefficient is 1). A compensation coefficient of the compensation region 10 of the left upper corner L0 is 0.9, and then the compensation data is 32*0.9=28.8. A compensation coefficient of the compensation region 100 of the lower right corner R is 0.87, and then the compensation data is 32*0.87=27.8. When the display panel 10 is to display grayscale value of 64, the grayscale can be compensated according to a brightness compensation look-up table corresponding to a grayscale value of 64.

When the display panel 10 is to display a grayscale value of 45, but the calibration gray scale values only include 32 or 64 and no brightness compensation look-up table corresponds to the grayscale value of 45, a brightness compensation look-up table corresponding to the calibration gray scale values 32 and a brightness compensation look-up table corresponding to the calibration gray scale value of 64 can be used to implement an interpolation process to obtain a brightness compensation look-up table corresponding to the grayscale value of 45.

Furthermore, according to the above example 1 and example 2, when the grayscale value adjusted, the compensation data is obtained by multiplying a grayscale value of unit pixel P by a compensation coefficient. The unit pixel P can include a plurality of red, blue, and red sub-pixels, each sub-pixel itself can also change a grayscale value in the grayscale range. Therefore, a brightness compensation look-up table corresponding to each of the sub-pixels can also be generated to implement grayscale compensation respectively to acquire a more precise compensation effect.

To acquire a better brightness enhancement effect, compensation regions can set brightness compensation look-up tables under all of the grayscale values. However, to save resources, there is no need for setting brightness compensation look-up tables for all of the grayscale values. According to characteristic of the TFT-LCD 10, only some of the grayscale values are needed to implanting setting the compensation coefficient. Generally, taking the grayscale range including 256 grayscale values as an example, only the grayscale values of 16, 32, 64, 128, and 192 are selected as calibration gray scale values to set the compensation coefficients. Compensation coefficients of remaining grayscale values can be obtained by a linear interpolation calculation according to the compensation coefficients corresponding to the calibration gray scale values.

The present application comprises at least advantages as follows:

The present application provides a display device brightness compensation look-up table obtaining method, a device thereof, and a display device thereof. The display device brightness compensation look-up table obtaining method comprises a compensation look-up table generation step. The display device comprises a memory unit including a brightness compensation look-up table. The display device brightness compensation look-up table generation device comprises a brightness compensation look-up table output module configured to output a brightness compensation look-up table. The present application, records compensation data of each of the compensation regions and the compensation region to constitute a brightness compensation look-up table corresponding to the calibration gray scale values according to the calibration gray scale values, performs brightness compensation to the compensation regions of the display device according to the brightness compensation look-up table, and therefore solve the technical issue that conventional demura technologies cannot make entire uniformity of brightness and chroma of the display device reach an expected level such that brightness of an edge region of display device is still darker than brightness of a central region to cause uneven brightness and color of the display device to result poor quality of the display panel.

Furthermore, original grayscale voltage and white tracking function of the display device are used in the method and the device of in the present application, only a few register addresses are needed to be added in a timing controller of the display device for storing brightness compensation look-up tables of several selected calibration gray scale values, brightness compensation look-up tables of other grayscale values can be obtained by an interpolation process, and therefore there is almost no need for changing hardware of the display device and a cost of modifying the display device is ultra low.

The display device brightness compensation look-up table obtaining method, the display device, and the display device brightness compensation look-up table generation device provided by the embodiment of the present application are described in detail as above.

In the specification, the specific examples are used to explain the principle and embodiment of the present application. The above description of the embodiments is only used to help understand the method of the present application and its spiritual idea. Meanwhile, for those skilled in the art, according to the present the idea of invention, changes will be made in specific embodiment and application. In summary, the contents of this specification should not be construed as limiting the present application.

What is claimed is:

1. A display device brightness compensation look-up table obtaining method, comprising:

a parameter reading step comprising loading a plurality of parameters into a process unit of a display device brightness compensation look-up table generation device, wherein the parameters comprise: compensation region dividing parameters of a display panel of a display device and a plurality of calibration gray scale values, and the compensation region dividing parameters comprise a means for dividing the display panel into a plurality of compensation regions;

an initial grayscale brightness detection step comprising according to one of the calibration gray scale values, for the display device displaying an image with the same calibration gray scale value throughout the image, detecting and recording a true brightness value of each of the compensation regions of the display device;

a compensation region brightness detection step comprising defining one of the compensation regions of the display device as a standard compensation region, and for the compensation region having the true brightness value different from the true brightness value of the standard compensation region, detecting the true brightness value of the compensation region after a display grayscale value of the display device is adjusted;

a compensation data obtaining step comprising repeatedly implementing the compensation region brightness detection step and defining the display grayscale value of the display device as compensation data when a difference between the true brightness value of the compensation region and the true brightness value of the standard compensation region is a minimum difference; and a compensation look-up table generation step comprising under the calibration gray scale values, recording each of the compensation regions and compensation data of each of the compensation regions to constitute a brightness compensation look-up table corresponding to the calibration gray scale values.

2. The display device brightness compensation look-up table obtaining method according to claim 1, wherein the means for dividing the display panel into the compensation regions comprises dividing the display panel into a plurality of compensation regions being rectangular, wherein an area of the compensation region near a periphery of the display device is less than an area of the compensation region near a center of the display device, and the compensation region located at the center of the display device is a standard compensation region.

3. The display device brightness compensation look-up table obtaining method according to claim 1, wherein in the compensation region brightness detection step, the display device brightness compensation look-up table generation device simultaneously obtains the true brightness values of all of the compensation regions.

4. The display device brightness compensation look-up table obtaining method according to claim 1, wherein the display device comprises a white tracking (WT) function including a frame control (FRC) function or a dither function, a grayscale value adjustment unit of the display device is less than 1 grayscale level, in the compensation region brightness detection step, the display grayscale value adjustment unit of the display device is less than 1 grayscale level.

5. The display device brightness compensation look-up table obtaining method according to claim 4, wherein in the compensation data obtaining step repeatedly implementing the compensation region brightness detection step and defining the display grayscale value of the display device as compensation data when a difference between the true brightness value of the compensation region and the true brightness value of the standard compensation region is a minimum difference, the display grayscale value of the display device is adjusted by using an adjustment unit of 1 grayscale level to obtain a value of the minimum difference, and then is adjusted by using an adjustment unit less than 1 grayscale level to obtain a more precise value of the minimum difference.

6. The display device brightness compensation look-up table obtaining method according to claim 1, wherein the display device brightness compensation look-up table generation device is connected to the display device through a transmission line to provide the display device in the initial grayscale brightness detection step with image data displayed entirely with the same calibration gray scale value, and the display device brightness compensation look-up table obtaining method, after the compensation look-up table generation step, further comprises:

a brightness compensation look-up table output step comprising outputting and storing the brightness compensation look-up table into the display device through the transmission line.

7. The display device brightness compensation look-up table obtaining method according to claim 1, wherein the brightness compensation look-up table records each of the compensation regions and a compensation coefficient of each of the compensation regions, and the compensation coefficient=compensation data/calibration gray scale value.

8. The display device brightness compensation look-up table obtaining method according to claim 1, wherein a number of the calibration gray scale values is less than 256, and a number of the calibration gray scale values less than level 128 is greater than a number of the calibration gray scale values greater than level 128.

9. The display device brightness compensation look-up table obtaining method according to claim 1, wherein the means for dividing the display panel into a plurality of compensation regions comprises dividing the display panel into a plurality of compensation regions being rectangular, wherein an area of the compensation region near a periphery of the display device is less than an area of the compensation region near a center of the display device, and the compensation region located at the center of the display device is the standard compensation region;

in the compensation region brightness detection step, the display device brightness compensation look-up table generation device simultaneously obtains the true brightness values of all of the compensation region; and the display device comprises a white tracking (WT) function including a frame control (FRC) function or a dither function, a grayscale value adjustment unit of the display device is less than 1 grayscale level, in the compensation region brightness detection step, the display grayscale value adjustment unit of the display device is less than 1 grayscale level.

10. The display device brightness compensation look-up table obtaining method according to claim 9, wherein in the compensation data obtaining step repeatedly implementing the compensation region brightness detection step and defining the display grayscale value of the display device as compensation data when a difference between the true brightness value of the compensation region and the true brightness value of the standard compensation region is a minimum difference, the display grayscale value of the display device is adjusted by using an adjustment unit of 1 grayscale level to obtain a value of the minimum difference, and then is adjusted by using an adjustment unit less than 1 grayscale level to obtain a more precise value of the minimum difference.

11. The display device brightness compensation look-up table obtaining method according to claim 9, wherein the display device brightness compensation look-up table generation device is connected to the display device through a transmission line to provide the display device in the initial grayscale brightness detection step with image data displayed entirely with the same calibration gray scale value, and the display device brightness compensation look-up table obtaining method, after the compensation look-up table generation step, further comprises:

a brightness compensation look-up table output step comprising outputting and storing the brightness compensation look-up table into the display device through the transmission line.

12. The display device brightness compensation look-up table obtaining method according to claim 9, wherein the brightness compensation look-up table records each of the compensation regions and a compensation coefficient of each of the compensation regions, and the compensation coefficient=compensation data/calibration gray scale value.

13. The display device brightness compensation look-up table obtaining method according to claim 9, wherein a number of the calibration gray scale values is less than 256, and a number of the calibration gray scale values less than level 128 is greater than a number of the calibration gray scale values greater than level 128.

14. A display device brightness compensation look-up table generation device, comprising:

a brightness detection unit configured to detect an image brightness of a display panel of a display device;

a connection line unit configured to connect with the display device and provide a display device with a plurality of image data such that the display device generates an image with a single grayscale on the entire image according to the image data, and store the look-up table into a control unit of the display device after a look-up table is generated; and a process unit connected to the brightness detection unit, and configured to receive detection data provided by the brightness detection unit, wherein the process unit comprises:

a parameter reading module configured to load a plurality of parameters, wherein the parameters is recorded in a storage module or inputted by a user interface module, and the parameters comprise: a plurality of compensation region dividing parameters of the display panel of the display device and a plurality of calibration gray scale values, wherein the compensation region dividing parameters comprise a means for dividing the display panel into a plurality of compensation regions;

a grayscale brightness detection module configured to control the brightness detection unit to detect true brightness values displayed by the compensation regions;

a compensation region brightness calculation module configured to define one of the compensation regions as a standard compensation region, and configured to, for the compensation region having the true brightness value different from the true brightness value of the standard compensation region, detect the true brightness value of the compensation region after a display grayscale value of the display device is adjusted;

a compensation data obtaining module configured to control the compensation region brightness calculation module to repeatedly implement compensation region brightness detection and define the display grayscale value of the display device as compensation data when a difference between the true brightness value of the compensation region and the true brightness value of the standard compensation region is a minimum difference; and a compensation look-up table generation module configured to, under the calibration gray scale values, record each of the compensation regions and the compensation data of each of the compensation regions to constitute a brightness compensation look-up table corresponding to the calibration gray scale values; and a brightness compensation look-up table output module configured to output and store the brightness compensation look-up table to the display device through the connection line unit.

* * * * *